United States Patent [19]

Sunder-Plassmann et al.

[11] 3,893,967

[45] *July 8, 1975

[54] COATING COMPOSITIONS AND PROCESS FOR THE PRODUCTION THEREOF

[75] Inventors: Paul Sunder-Plassmann, Marl; Klaus Gorke, Hullern; Walter Dittmann, Marl, all of Germany

[73] Assignee: Chemische Werke Huels, A.G., Marl, Germany

[ * ] Notice: The portion of the term of this patent subsequent to Nov. 6, 1990, has been disclaimed.

[22] Filed: July 27, 1973

[21] Appl. No.: 383,254

[30] Foreign Application Priority Data

July 27, 1972 Germany.............................. 2236842

[52] U.S. Cl..... 260/32.8 A; 106/287 R; 260/32.8 R; 260/33.6 A; 260/47 UP
[51] Int. Cl............................................. C08g 33/10
[58] Field of Search.................. 106/287; 260/32.8 A

[56] References Cited
UNITED STATES PATENTS 3,770,688  11/1973  Sunder-Plassman ........... 260/32.8 A

*Primary Examiner*—Theodore Morris
*Attorney, Agent, or Firm*—Millen, Raptes & White

[57] ABSTRACT

Coating compositions comprising a phenolic adduct of an unsaturated liquid polybutadiene wherein said adduct consists essentially of:

a. 62–75% by weight of a liquid polybutadiene having, prior to the adduct formation, a viscosity of 200–5,000 cp. at 20° C., a molecular weight of 500–4,000 as determined by vapor pressure osmosis, an iodine number of 400–470 g. iodine/100 g., and double bonds which are 50–95% in the cis-1,4 configuration; and b. correspondingly 38–25% by weight of phenol, 35–50% of which is joined to the polybutadiene as a phenyl ether and the remaining 65–50% of which is joined thereto ortho- and para- to the phenolic hydroxy group;

said adduct containing 5–35% of the olefinic double bonds of the liquid polybutadiene.

17 Claims, No Drawings

COATING COMPOSITIONS AND PROCESS FOR THE PRODUCTION THEREOF

BACKGROUND OF THE INVENTION

This invention relates to coating compositions, more particularly those comprising a phenolic adduct of a liquid polybutadiene, optionally together with plasticizers, pigments and customary varnish adjuvants, and to a process for the production thereof.

Adducts of phenols and olefinically unsaturated polymers have heretofore been employed as a component of coating compositions.

U.S. Pat. No. 3,391,115 describes addition products of phenol and preferably addition products based on copolymers of styrene and butadiene (molecular weight of the copolymers: 8,000 –10,000) having a phenol content of no more than 7 %. Addition products of phenol and homopolymers of butadiene are also described. The products have a softening point of less than 22°C. and coatings formed therefrom must be baked at about 200°C. in the presence of driers. Therefore, they have only the very limited range of application, for example for enameling sheet metal, e.g., in the production of food cans.

British Pat. No. 1,106,267 describes addition products from phenol and copolymers of isoprene and butadiene having a molecular weight of approximately 100,000 or above with a phenol content of 10–40%, based on the proportion of copolymer of the addition product, or 9–29%, based on the addition product; these products are suitable, inter alia, as binders for coatings. The products are characterized by average molecular weights of about 3,000 –20,000 with cyclizing units resulting from adjacent isoprene or methyl butenamer units, residual olefinic double bonds and phenolic hydroxy groups. The products are preferably manufactured in the presence of concentrated phosphoric acid as the catalyst, the viscosity being considerably lowered due to the degradation of the copolymer macromolecules. The process corresponds to the conventional production of the cyclorubbers commercially available as varnish binders, by the degradation of natural rubber in the presence of phenol and an acidic catalyst.

U.S. Pat. No. 3,770,688, the contents of which are incorporated by reference herein, describes addition products of phenol and a liquid polybutadiene having a molecular weight, determined by vapor pressure osmosis, of 500 – 4,000 with a phenol content of 10–30%. Coating compositions produced therefrom are essentially physically drying and, to a subordinate extent, are subject to oxidative post crosslinking. Therefore, they need not be baked in the presence of driers to ensure form a useful coating. Consequently, they are useful in a wide variety of applications, e.g., as varnishes for pipe couples, boat paints, varnishing of synthetic resins and articles of wood, painting swimming pools, in printing inks, etc.

The coating compositions described in the preceding paragraph comprise an adduct of phenol to liquid polybutadiene, plasticizers, pigments, and conventional auxiliary varnish agents; such coating compositions overcome many of the disadvantages of the relevant state of the art and are characterized by an adduct comprising (a) 70–90% by weight of a liquid polybutadiene having, prior to adduct formation, a viscosity of 200 – 5,000 centipoises at 20° C., a molecular weight of 500 – 4,000 as determined by vapor pressure osmosis, an iodine number of 400 – 470 g. iodine/100 g., and double bonds which are 50–95% in the cis-1,4 configuration; and (b) 30–10% by weight of phenol, about 5–35% of which is joined to the polybutadiene as a phenyl ether and the remaining 95–65% of which is bound thereto o- and p- to the phenolic hydroxyl group. These coating compositions are furthermore characterized by the adduct containing 5–35% of the original olefinic double bonds present in the polybutadiene.

Coating compositions have now been discovered which likewise consist of an adduct of phenol to liquid polybutadiene, plasticizers, pigments, and conventional auxiliary varnish agents and which are distinguished by an improved array of properties, particularly from the viewpoint of varnish technology.

OBJECTS OF THE INVENTION

Accordingly, it is our object of the present invention to provide improved coating composition based on an adduct of phenol to liquid polybutadiene.

Another object of this invention is to provide such coating compositions particularly suitable for use in varnish technology.

A further object of this invention is to provide coating compositions particularly suitable for coating onto metals.

An additional object of this invention is to provide a process for preparing phenol-liquid polybutadiene adducts suitable for use in coating compositions.

Upon further study of the specification and appended claims, further objects and advantages of this invention will become apparent to those skilled in the art.

SUMMARY OF THE INVENTION

Briefly, the above and other objects are attained in one aspect of the present invention by providing a coating composition comprising a phenolic adduct of an unsaturated liquid polybutadiene wherein said adduct consists essentially of:

a. 62–75% by weight of a liquid polybutadiene having, prior to the adduct formation, a viscosity of 200 – 5,000 cp. at 20° C., a molecular weight of 500 – 4,000 as determined by vapor pressure osmosis, an iodine number of 400 – 470 g. iodine/100 g., and double bonds which are 50–95% in the 1,4-cis-configuration; and b. correspondingly 38–25% by weight of phenol, 35–50% of which is joined to the polybutadiene as a phenyl ether and the remaining 65–50% of which is joined thereto ortho- and para- to the phenolic hydroxy group; said adduct containing 5–35% of the olefinic double bonds of the liquid polybutadiene.

DETAILED DISCUSSION

The coating compositions of the present invention are distinguished from those of the aforementioned U.S. Pat. application by containing a lesser proportion of the liquid polybutadiene, i.e., 62–75 weight %, preferably 67 – 72 weight % liquid polybutadiene. Correspondingly, the phenol component in accordance with the present invention is increased to 38–25 weight %. Most importantly, the nature of the adducted phenol is different, being present 35–50%, preferably 35–44 % as the phenyl ether and correspondingly 65–50%, preferably 65–56 % bound in the ortho-and para-positions to the phenolic hydroxyl group.

Thus, very specific requirements must be met by the adducts usable for the coating compositions of this invention, with respect to their chemical composition, structure, and physical properties.

Suitable liquid polybutadienes useful for adduct formation in the present invention are those which are at least 97% linear, i.e. wherein at least 97% of the butadiene is polymerized to 1,4-linking; which have a viscosity at 20° C. of between about 200 and 5,000 centipoises, preferably between about 300 and 3,000 centipoises; a molecular weight, as determined by vapor pressure osmosis, of between about 500 and 4,000, preferably about 800 and 2,000, and an iodine number of between about 400 and 470 g. iodine/100 g., preferably about 420–465 g. iodine/100 g.; and which contain 50–95%, preferably 55–90% of the double bonds in the cis-1,4-configuration. Especially suitable is a liquid polybutadiene having a viscosity of 400 – 850 centipoises at 20° C., a molecular weight, determined by vapor pressure osmosis, of 1,000 – 1,800, an iodine number of 440–465 g. iodine/100 g., and the double bonds of which 65–85% have a cis-1,4 structure, 14–35% a trans-1,4-configuration, and which contains 0–1% of the double bonds as vinyl (1,2) double bonds. Such polybutadienes can easily be produced in a known manner, e.g. according to German Pat. No. 1,186,631 and German Pat. No. 1,292,853.

Specific requirements must be met by the adducts usable for the coating compositions of this invention, with respect to their chemical structure. Thus, of the 25–38% by weight, preferably 28–33% by weight of the phenol contained in the adduct, 35–50%, preferably 35–44% must be present as the phenyl ether, and 65–50%, preferably 65–56% must be bound in the o- and p-positions, with respect to the phenolic hydroxy group, to the polybutadiene.

There must still be present in the finished adduct 5–35%, preferably 7–20%, of the olefinic double bonds contained in the polybutadiene prior to the adduct formation. The reaction conditions during the adduct formation, therefore, must be selected so that the double bonds not consumed by phenol addition are not all eliminated by cyclization, i.e. formation of cycloaliphatic rings accompanied with the consumption of olefinic double bonds.

In accordance with a preferred embodiment of this invention, the coating compositions are produced by reacting the selected liquid polybutadiene with the phenol in a certain weight ratio at a temperature of 90°–185° C. in the presence of about 0.08 - 1% by weight of an acidic catalyst, based on the liquid polybutadiene, and optionally in the presence of an organic solvent.

The phenol content of the addition product is largely dependent on the ratio of phenol/liquid polybutadiene in the reaction charge. In order to produce an adduct containing 25–38% by weight of the phenol component, 1 part by weight of liquid polybutadiene is generally employed with 2–6 parts, preferably 2.5 – 5 parts by weight of phenol. The higher the molecular weight of the liquid polybutadiene employed, the higher will be the quantitative ratio of phenol to liquid polybutadiene, so that the addition product does not contain any gel particles and/or to that the reaction charge does not gel.

In order to suppress the formation of gel particles, the reaction can also be conducted in the presence of inert organic solvents. Suitable solvents are well known in the art and include but are not limited to aromatics, e.g. benzene, toluene, xylene, or chlorobenzene; chlorinated hydrocarbons, e.g., 1,1,2,2-tetrachloroethane, etc. either individually or in admixture. In the presence of volatile solvents, the heat of reaction can readily be removed by evaporative cooling. However, the presence of solvents also requires that the solvent, as well as the unreacted phenol, be returned into the cycle.

As is known, acidic catalysts are necessary for chemically adding phenol to the liquid polybutadiene. Suitable catalysts include but are not limited to trifluoromethanesulfonic acid, fluoboric acid ($HBF_4$), and perchloric acid. Preferably, an at least 60% by weight aqueous trifluoromethanesulfonic acid or a 60–74% by weight aqueous perchloric acid is utilized. If adduct formation takes place without a solvent, Lewis acids such as boron trifluoride can be used as catalysts.

The catalysts are employed in catalytic amounts, advantageously of 0.08 – 1% by weight, preferably 0.1 – 0.6% by weight, based on the liquid polybutadiene. The exothermic heat of reaction is liberated for the most part during the main reaction, i.e. in the metered charging of the catalyst.

The reaction temperature is generally 90°– 185° C., preferably 110°– 150° C. The reaction temperature in the post reaction can be increased as compared to that of the main reaction, for example, by 20° C., in order to shorten the post reaction time.

The reaction time required for adduct formation is dependent on the type and quantity of the catalyst employed and on the reaction temperature. In general, the reaction time is between 15 minutes and 3 hours. In any event, the reaction time must be adapted which, in conjunction with the other critical parameters discussed herein, will produce adducts having the particular chemical composition, structure, and physical characteristics required for the coatings of the present invention.

The adducts can be manufactured in a batchwise or continuous mode of operation. The possibility of conducting adduct formation continuously is often of special advantage.

The adducts can be worked up in accordance with conventional methods. The excess phenol and optionally solvent can be extensively distilled off, preferably under reduced pressure. For this purpose, devices such as thin-film evaporators and the like are advantageously employed. Thereafter, the reaction product is advantageously precipitated under agitation for purposes of further purification, e.g. with methanol, but preferably with isopropanol. When there is no solvent present in the reaction charge, water is also a suitable precipitant. The precipitation, which can be effected at room temperature or, if desired, in a closed apparatus at an elevated temperature under pressure, results in the separation of residual free phenol, inorganic components, and other impurities.

In case the product is produced, during the precipitation at room temperature, in a highly viscous state rather than in a solid, finely divided form so that it cannot be vacuum-filtered, it is advantageous to dissolve the product again in a suitable solvent, e.g. methylene chloride, chloroform, etc., and to reprecipitate the product. Prior to or during the working-up step, it is practical to remove or inactivate the acidic catalyst. The removal of the catalyst is preferably accomplished when using fluoboric acid by distillation and, when using trifluoromethanesulfonic acid or perchloric acid, by means of an anion exchanger in hydroxyl form. The catalyst can be inactivated by neutralization with any suitable base such as alkali hydroxides, e.g. sodium or potassium hydroxide, alkali salts of weak acids, e.g. sodium carbonate or sodium acetate; ammonia, or with amines, e.g. triethylamine, preferably by neutralization with sodium hydroxide. This step avoids the danger of spontaneous cross-linking during the working-up procedure or during storage.

Instead of isolating the pure product in a finely divided solid phase by a suction filter or the like, it can also be taken up in xylene, especially if present in a viscous form after washing with methanol or isopropanol under heating, and the residual methanol or isopropanol can then be distilled off. In this way, a clear solution of the product in xylene is obtained.

To produce the coating compositions of this invention, the specific addition products of phenol and liquid polybutadiene are combined with a plasticizer, optionally dissolved in a suitable solvent. A particularly advantageous plasticizer is bis($\beta$-phenoxyethyl)formal ("Desavin," Bayer A.G.), which is employed in amounts of 15–30% by weight, preferably 18–25% by weight, based on the total mixture of the adduct and plasticizer.

The coating compositions of this invention are suitable for the production of coatings on substrates of all types, especially on metals. A great variety of methods can be utilized for coating the articles. For example, sheet metal can be coated by roll coating or powder coating, if the use of a solvent is to be dispensed with. In solution, the coating compositions can be applied by hand as well as by spraying or dipping processes. Suitable solvents are known in the art and include but are not limited to the volatile aromatics, esters, ketones and chlorinated hydrocarbons, but xylene is preferred. The coating composition employed in the solvent as a solution having a concentration of 25–75% by weight, preferably 45–65% by weight. The coating compositions of this invention can contain the usual additives and auxiliary agents, e.g. pigments, dyes, flow agents, corrosion-protective agents, and optionally other binders, such as, e.g. alkyd resins (with which the adducts of this invention show a good compatibility) and drying oils.

The coating compositions of this invention, which are prepared from readily accessible and inexpensive starting materials, are especially distinguished as physically drying coating compositions with good dust-drying and complete-drying times which are subject to advantageous oxidative secondary cross-linking process, forming coatings of excellent hardness, permanent elasticity, and adhesion. They can surpass in their array of properties the cyclorubber or chlorinated rubber coating compositions presently customary for coating of metallic surfaces. In comparison with coatings of the aforementioned U.S. Pat. No. 3,770,688, those of the present invention are distinguished by better permanent elasticity (higher numerical values of the Erichson depression) in long time aging (40 days at 70°C).

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

Preparation of a Liquid Polybutadiene-Phenol Adduct 4,000 g. of technical grade phenol and 1,000 g. of "Polyoel Huels 110" (liquid polybutadiene of Chemische Werke Huels A.G.) having a viscosity of 750 centipoises at 20° C., an iodine number of 450 g. iodine/100 g., a molecular weight of 1,400 (determined by vapor pressure osmosis), a double bond distribution of about 75% 1,4-cis, about 25% 1,4-trans, and less than 1% vinyl groups, are combined and heated to about 100° C. under nitrogen. During the course of one-half hour, there is added under agitation a mixture of 1.26 ml. of 70% by weight aqueous perchloric acid (density 1.67 g./cm$^3$, approximately 0.14% by weight based on the liquid polybutadiene) and 50 g. of phenol, heated to about 50° C. During this step, the temperature rises to 120° C. and is maintained at this value by external cooling. The charge is agitated for another hour at 120° C. The reaction is then stopped by adding 15 ml. of 2N sodium hydroxide solution. About 2,000 g. of phenol is distilled off at 80°–120° C. (1 torr pressure) in a forced circulation evaporator. With the use of an "Ultra-Turrax" mixer, the residue is stirred, after cooling to about 100° C., into 15 l. of methanol. The thus-precipitated, highly viscous product is separated by decanting excess washing liquor, dissolved in 1.5 l. of methylene chloride, and again precipitated by stirring into 10 l. of methanol. These last operations are repeated twice. The product is then taken up in 2 liters of xylene and concentrated to 1,850 g. by means of a forced circulation evaporator to separate residual methanol. The viscosity, as determined in the Haake rotary viscometer is 10,800 centipoises/20° C. A sample is freed from the solvent at 70°–80° C./1 torr in a forced circulation evaporator; the resultant product is an expanded foam which can be comminuted to a yellowish powder.

Solids content of the solution of the product in xylene: 65% by weight ≙ 1,200 g. yield.

The analytical data are as follows:

Oxygen content: 4.93% ≙ 29% phenol

IR analysis in carbon disulfide according to R. R. Hampton, Anal. Chem. 21: 923 (1949), and P. Sunder-Plassmann and G. Peitscher, Applied Macromolecular Chemistry, 24 : 205 (1972):

12% of the original olefinic double bonds, corresponding to 12% by weight of residual butenamer units, are still present;

37% of the total phenol content, determined by IR, is present as phenyl ether, and the remainder as o- and p-substituted phenol.

Molecular weight (determined by vapor pressure osmosis in chlorobenzene at 65° C.): 5,200 ± 10%.

Hydroxyl number (according to Zerewitinoff): 85 mg.KOH/g.

Preparation of the Coating Composition 120 parts by weight of the solution of the adduct of this invention in xylene (77.5 parts by weight of the adduct), 22.5 parts by weight of bis($\beta$-phenoxyethyl)formal, and 24 parts by weight of xylene are combined and stirred, producing a clear, homogeneous varnish solution having a solids content of 60% by weight.

Application and Testing of the Coatings

The coating composition of this invention is applied, by means of a 100 micron coating knife, to glass plates and deep-drawn metal sheets (thickness 1 mm.). The coatings are tested after aging in a forced-circulation drying chamber for 16 days at 70° C. The properties examined are the pendulum hardness according to Koenig in seconds on glass (DIN 53 157), as well as the Erichsen depression (DIN 53 156) and the adhesion to deep-drawn metal sheets. The adhesion is tested by cutting an oblique grid (45°) in the coat, pressing adhesive film thereagainst, tearing it off, and evaluating adhesive behavior according to DIN 53 151.

Comparative coatings are similarly produced and tested from coating compositions consisting of 70 parts by weight of "Cyklosit" (cyclorubber of Bayer A.G.) and 30 parts by weight of bis($\beta$-phenoxyethyl)formal in 67 parts by weight of xylene (comparison product A), and 50 parts by weight of "Pergut" S 10 (chlorinated rubber of Bayer A.G.), 45 parts by weight of "Chlophen" A 60 (chlorinated biphenyl of Bayer A.G.), and 5 parts by weight of bis($\beta$-phenoxyethyl)formal in 67 parts by weight of xylene (comparison product B). These coatings are likewise tested in accordance with the above-mentioned methods after aging for 16 days at 70° C.

Test Results

The following table indicates the test results obtained on a series of coatings. It can be clearly seen therefrom that the coating compositions of this invention constitute a technical advance in the art as compared to commercial comparison products, namely the great improvement in permanent elasticity (higher numerical values of the Erichsen depression) with superior hardness and very good adhesion.

TABLE

| Number | Composition of the Adduct | | Phenol | Binding | Residual | Film | Pendulum | Erichsen | Adhesion |
|---|---|---|---|---|---|---|---|---|---|
| | Liquid Polybutadiene % by Wt. | Phenol % by Wt. | Phenyl Ether % | o-and p-Substituted Phenol % | Content of Butenamer Units in Adduct % by Wt. | Thickness, microns | Hardness sec. | Depression mm. | |
| 1 | 73 | 27 | 40 | 60 | 15 | ca. 25 | 150 | 9.5 | very good |
| 2* | 71 | 29 | 37 | 63 | 12 | ca. 24 | 172 | >10 | " |
| 3 | 70 | 30 | 38 | 62 | 12 | ca. 22 | 179 | 9.5 | " |
| A | | | | | | ca. 26 | 126 | 0.7 | good |
| B | | | | | | ca. 22 | 190 | 1.0 | satisfactory |

*Product obtained in the Example for Preparation of the Coating Composition.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A coating composition comprising a phenolic adduct of an unsaturated liquid polybutadiene wherein said adduct consists essentially of:
   a. 62–70% by weight of a liquid polybutadiene having, prior to the adduct formation, a viscosity of 200 – 5,000 cp. at 20° C., a molecular weight of 500 – 4,000 as determined by vapor pressure osmosis, an iodine number of 400 – 470 g. iodine/100 g., and double bonds which are 50 – 95% in the 1,4-cis-configuration; and
   b. correspondingly 38–25% by weight of phenol, 35–50% of which is joined to the polybutadiene as a phenyl ether and the remaining 65 – 50% of which is joined thereto ortho- and para-to the phenolic hydroxy group; said adduct containing 5–35% of the olefinic double bonds of the liquid polybutadiene.

2. A coating composition according to Claim 1, wherein the liquid polybutadiene has a viscosity of 300 – 3,000 cp. at 20° C., a molecular weight of 800 – 2,000 as determined by vapor pressure osmosis, and an iodine number of 420 – 465 g. iodine/100 g., and 55 – 90% of whose double bonds are in the 1,4-cis-configuration.

3. A coating composition according to claim 2, wherein the liquid polybutadiene has a viscosity of 400 – 850 cp. at 20° C., a molecular weight of 1,000 – 1,800 as determined by vapor pressure osmosis, and an iodine number of 440 – 465 g. iodine/100 g., and 65–85% of whose double bonds are in the 1,4-cis-configuration, and less than 1% of which are vinyl.

4. A coating composition according to claim 1, wherein the adduct contains 33–28% by weight of phenol.

5. A coating composition according to claim 1, wherein 37–40 of the phenol is present in the adduct as a phenyl ether and the remainder thereof is joined ortho- and para-to the phenolic hydroxy group.

6. A coating composition according to claim 1, wherein 7–20% of the olefinic double bonds of the liquid polybutadiene are present in the adduct.

7. A coating composition according to claim 3, wherein the adduct contains 33–28% by weight of phenol.

8. A coating composition according to claim 7, wherein 35–44% of the phenol is present in the adduct as a phenyl ether and the remainder is joined ortho- and para- to the phenolic hydroxy group.

9. A coating composition according to claim 8, wherein 7–20% of the olefinic double bonds of the liquid polybutadiene are present in the adduct.

10. A coating composition according to claim 1, wherein a plasticizer is present in an amount of 15-30% by weight, based on the mixture of plasticizer and adduct.

11. A coating composition according to claim 10, wherein the plasticizer is present in an amount of 18–25% by weight, based on the mixture of plasticizer and adduct.

12. A coating composition according to claim 11, wherein the adduct contains 33–28% by weight of phenol.

13. A coating composition according to claim 12, wherein the adduct contains 27–30% of the phenol, of which 37–40% is present in the adduct as a phenyl ether and the remainder is joined ortho- and para-to the phenolic hydroxy group.

14. A coating composition according to claim 13, wherein 7–20% of the olefinic double bonds of the liquid polybutadiene are present in the adduct.

15. A coating composition according to claim 10, wherein the plasticizer is bis($\beta$-phenoxyethyl)formal.

16. A coating composition according to claim 1, comprising a solvent selected from the group consisting of aromatics, esters, ketones and chlorinated hydrocarbons.

17. A coating composition according to claim 16, wherein the solvent is xylene.

* * * * *

UNITED STATES PATENT OFFICE
CERTIFICATE OF CORRECTION

PATENT NO. : 3,893,967
DATED : July 8, 1975
INVENTOR(S) : Sunder-Plassmann et al.

It is certified that error appears in the above-identified patent and that said Letters Patent are hereby corrected as shown below:

Claim 1   Column 8, line 3:   "62-70%" should be --62-75%--.

Claim 1   Column 8, line 13:  "parato" should be --para-to--.

Claim 5   Column 8, line 34:  "37-40" should be --37-40%--.

Signed and Sealed this fourth Day of November 1975

[SEAL]

Attest:

RUTH C. MASON
Attesting Officer

C. MARSHALL DANN
Commissioner of Patents and Trademarks